3,268,541
PROCESS FOR PRODUCING 2-PHENYL- (OR SUBSTITUTED 2-PHENYL-) 1,3-DI(4-PYRIDYL)-2-PROPANOLS
Harvey Gurien, Newark, and Albert Israel Rachlin, Hackensack, N.J., assignors to Hoffman-La Roche Inc., Nutley, N.J., a corportion of New Jersey
No Drawing. Filed Mar. 5, 1964, Ser. No. 349,745
7 Claims. (Cl. 260—296)

This invention relates, in general, to a novel process. More particularly, the invention relates to a process for producing a known class of pharmacologically active pyridyl compounds.

The compounds which are produced by the process of this invention are members having the following formula:

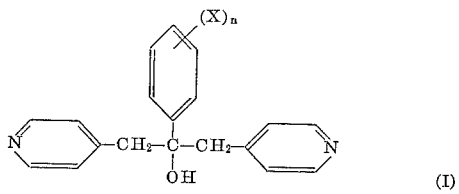

in which the symbol X represents a hydrogen atom, a halogen atom, a lower alkyl group, i.e., an alkyl group having from 1 to 6 carbon atoms, a lower alkoxy group or a lower alkylmercapto group; and in which the symbol $n$ represents the integer 1, with the proviso that where X is alkoxy, $n$ is additionally the integer 3, and salts thereof with medicinally acceptable acids. This class of compounds was known to us prior to our making the invention disclosed and claimed herein. We have discovered a new and greatly improved method for synthesizing such compounds.

In its broadest embodiment, the invention comprises a process for producing the Formula I compounds comprising reacting 4-picolyl lithium with an ester having the formula:

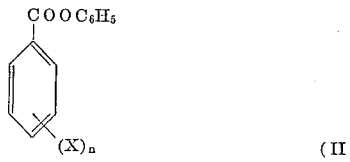

in which the symbols X and $n$ have the same meaning as in Formula I.

The process is particularly characterized in that it is carried out, using liquid ammonia as the solvent medium, at a temperature not higher than the reflux temperature of liquid ammonia.

In a more limited embodiment, the invention comprises a total synthesis of the Formula I compounds comprising the steps of (1) reacting lithium amide with 4-picoline, in liquid ammonia as the solvent medium, to form therein a suspension of 4-picolyl lithium in liquid ammonia: (2) reacting the said 4-picolyl lithium, while suspended in liquid ammonia, with the ester of Formula II; and (3) isolating the reaction product from the reaction mixture.

The present invention is noteworthy in that it provides an outstanding method for producing a class of compounds having valuable pharmacological properties. The process is particularly advantageous in several respects. First, since the over-all synthesis utilizes lithium amide as a starting material, the invention serves to permit one to avoid the use of the more expensive phenyl lithium which is commonly used in producing 4-picolyl lithium. Secondly, the process is of great commercial importance and practical significance in that it requires relatively short reaction times, permits a vastly simplified work-up of the reaction product and provides greatly increased yields.

The starting material in the overall process for producing the compounds of Formula I, namely, lithium amide, is known. Similarly, its production by conventional catalytic procedures is disclosed in the art. In one such procedure, lithium is introduced into a vessel containing liquid ammonia, that is, ammonia cooled to its reflux temperature, i.e., about −33° C. or lower. A small amount of catalyst, for example, ferric nitrate, is also present in the mixture. The mixture is stirred for a short period of time at the reflux temperature of liquid ammonia, whereby a suspension of lithium amide in liquid ammonia is formed. In a first step of the present process, a sufficient amount of 4-picoline is added to the liquid ammoniacal suspension of lithium amide to provide a reaction mixture containing approximately stoichiometrically equivalent quantities of lithium and 4-picoline. The reaction mixture is stirred continuously until 4-picolyl lithium is produced in the form of a suspension in liquid ammonia. During the foregoing step, the reaction mixture is maintained at the reflux temperature of liquid ammonia or at a temperature which is lower than the reflux temperature of liquid ammonia.

To the cold suspension of 4-picolyl lithium in ammonia, there is subsequently added the ester of Formula II. As the Formula II ester one can use, for example, phenyl benzoate or an appropriately substituted phenyl benzoate, such as a phenyl lower alkyl-substituted benzoate, for example, phenyl methylbenzoate, phenyl ethylbenzoate, phenyl propylbenzoate, etc.; a phenyl halogen-substituted benzoate, for example, phenyl chlorobenzoate, phenyl bromobenzoate, etc.; a phenyl lower alkoxy-substituted benzoate, for example, phenyl methoxybenzoate, phenyl ethoxybenzoate, phenyl tri-methoxybenzoate, etc.; or a phenyl lower alkylmercapto-substituted benzoate, for example, phenyl methylmercaptobenzoate, phenyl ethylmercaptobenzoate, etc. The ester reactant can be used as is or it may be introduced into the reaction vessel in the form of a solution or suspension in some suitable solvent. As the solvent for the ester reactant there can be used, for example, ethyl ether, n-butyl ether, dioxane, tetrahydrofuran, etc.

In carrying out the process of this invention, there is used, preferably, a ratio of at least about 2.0 moles of 4-picolyl lithium for each mole of the Formula II compound employed. Obviously, however, larger or smaller quantities of the 4-picolyl lithium can be used, if desired.

The reaction mixture at this stage of the process, such mixture then comprising the 4-picolyl lithium, the phenyl benzoate compound and liquid ammonia, is stirred at the reflux temperature of liquid ammonia, or lower, until the reaction has proceeded to completion. Thereafter, an ammonium salt of a mineral acid, for example, ammonium chloride, is added to neutralize any organic lithium compound present in the reaction mixture. During the latter step, also, the reaction mixture is maintained at the reflux temperature of liquid ammonia or lower. In a next succeeding step, the liquid ammonia solvent is removed from the reaction mixture. This is accomplished, conveniently, by allowing the reaction mixture to stand, for example, at room temperature or, in the alternative, by heating the mixture at a temperature elevated somewhat above room temperature. The residue which remains after the ammonia has been removed is subsequently taken up in an appropriate solvent. In general, one may use any inert solvent in which the reaction product is soluble. In the preferred procedure, a lower molecular weight monohydric aliphatic alcohol, such as, boiling isopropanol, is used as the solvent. If desired, however, the residue can be taken up in some other inert solvent, such as, acetone, methyl ethyl ketone, pyridine, etc. The solution which is thus obtained is filtered and the pyridyl compound which has been produced during the course of the reaction is precipitated by the addition of water to the filtrate. Such precipitate can be recovered by any appropriate means, for example, by filtration, and subsequently purified by any suitable procedure.

In one preferred purification technique, the dried precipitate is dissolved in a heated solvent. Boiling ethanol is especially well suited for use as the solvent. To this solution there is added activated charcoal, silica gel and alumina. The mixture is then stirred at reflux temperature for a short period of time. The heated mixture is subsequently filtered and cold water is added to the filtrate. The mixture is thereafter cooled to effect the precipitation of the pyridyl compound. In an alternate purification procedure, the dried precipitate is recrystallized from some suitable solvent, for example, butyl acetate, butyl alcohol, ethyl acetate, acetonitrile, etc. The compound which is obtained by either of the described purification procedures can be converted, if desired, into a salt of a medicinally acceptable acid. Such salts include, for example, salts of hydrochloric acid, sulfuric acid, nitric acid and p-toluene sulfonic acid.

It will be understood that the purification procedures which are described in the preceding paragraph are exemplary only and that they are included herein merely for the purpose of illustration. Other procedures which are entirely suitable for purifying the reaction products will be readily apparent to persons skilled in the art. Such other procedures can be used to obtain the compounds which are produced by the process of this invention in a highly refined form.

The compounds of Formula I are known to possess interesting and valuable pharmacological properties. They are used to relieve and diminish tremors and to ameliorate the condition of subjects afflicted with tremors. The compounds have particular utility as medicaments for the treatment of Parkinson's Disease since they afford relief to, and effect a diminution of, not only the tremors but also the rigidity which are characteristic symptoms of that disease. The foregoing notwithstanding, however, it is to be understood that the present invention embraces only the disclosed process for preparing the compounds of Formula I, and the acid addition salts thereof, and not the compounds themselves.

For a fuller understanding of the nature and objects of this invention, reference may be had to the following example which is given merely as a further illustration of the invention and is not to be construed in a limiting sense.

Example

In this example, 600 ml. of liquid ammonia and a small amount of ferric nitrate [$Fe(NO_3)_3 \cdot 9H_2O$] were charged into a 3-neck flask equipped with stirrer, low temperature thermometer, dropping funnel and Dry Ice cooled condenser. These reactants, cooled to a temperature of about $-33°$ C., were introduced into the flask under an atmosphere of dry nitrogen. Thereafter, 6.25 grams (0.90 mole) of lithium foil was added gradually to the mixture. There was, thus obtained, a suspension of lithium amide which was stirred for a period of about 15 minutes. At the end of that period of time, 84.0 grams (0.9 mole) of 4-picoline was added to the lithium amide suspension over a period of about 30 minutes, the temperature of the reaction mixture during such addition being maintained at about $-33°$ C. The mixture was then stirred for a period of about two and one-half hours at a temperature of about $-33°$ C. following which 89.2 grams (0.45 mole) of phenyl benzoate was slowly added thereto. The reaction mixture, while still maintained at a temperature of about $-33°$ C., was stirred for a period of about one and one-half hours, following which 48.0 grams (0.90 mole) of ammonium chloride was added. Subsequently, the ammonia was allowed to evaporate by permitting the reaction mixture to stand at room temperature. The residue which remained after the ammonia had been removed, was taken up in 1200 ml. of boiling isopropanol, filtered while still hot and then cooled. Thereafter, 3600 ml. of cold water was added slowly, with stirring, to the filtrate which was at room temperature. The mixture was chilled overnight and then filtered. The product, thus obtained, was dried in vacuo to give 2-phenyl-1,3-di(4-pyridyl)-2-propanol melting at 152° to 160° C.

The 2-phenyl-1,3-di(4-pyridyl)-2-propanol, obtained as described in the preceding paragraph, was then dissolved in 200 ml. of boiling ethanol. To this solution there was added 3.5 grams of Norit A (a commercially available activated charcoal), 0.7 gram of silica gel and 0.7 gram of alumina. The mixture was stirred for a period of about ten minutes at reflux temperature and subsequently filtered. The filter was then washed with 22 ml. of ethanol and the filtrate from the washing step was added to the original filtrate. Water was added to the combined filtrates and the mixture was chilled overnight. The mixture was then filtered, washed with cold water and dried in vacuo to yield pure 2-phenyl-1,3-di(4-pyridyl)-2-propanol melting at 165.5° to 166.5° C.

20 grams of 2-phenyl-1,3-di(4-pyridyl)-2-propanol, produced as described in the preceding paragraph, were dissolved in 3000 cc. of ethyl acetate. Subsequently, this solution was saturated with dry hydrogen chloride. A precipitate was thus formed and, after filtration thereof, the hygroscopic filter cake was dried, in vacuo, at a temperature of about 60° C. over concentrated sulfuric acid. The crude solid was then dried and digested for a period of about thirty minutes with 1000 cc. of refluxing ethyl acetate. After filtration and drying, in vacuo, at a temperature of about 60° C. over concentrated sulfuric acid, there was obtained 2-phenyl-1,3-di(4-pyridyl)-2-propanol dihydrochloride melting at 227° to 229° C., with decomposition. No change in the melting point of this compound was observed after the product had been recrystallized three times from a mixture of isopropanol and ethyl acetate.

We claim:
1. A process for the production of compounds having the formula

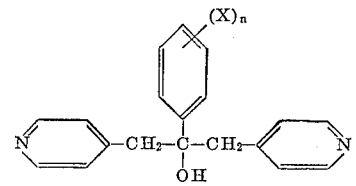

in which the symbol X represents a member selected from the group consisting of hydrogen, a halogen atom, an alkyl group having from 1 to 6 carbon atoms, a lower alkoxy group and a lower alkylmercapto group; and in which the symbol $n$ represents the integer 1, with the proviso that where X is alkoxy, the symbol $n$ represents also the integer 3 which comprises reacting 4-picolyl lithium with an ester having the formula

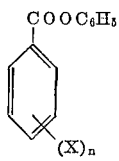

in which X is a member selected from the group consisting of hydrogen, a halogen atom, an alkyl group having from 1 to 6 carbon atoms, a lower alkoxy group and a lower alkylmercapto group; and in which *n* represents the integer 1, with the proviso that where X is alkoxy, *n* represents also the integer 3 said reaction being carried out in liquid ammonia as the reaction medium at a temperature not higher than reflux temperature of liquid ammonia.

2. The process of claim 1 wherein, in next succeeding steps, the reaction mixture is treated with an ammonium salt of a mineral acid and evaporated to dryness, following which the residue is taken up in an inert organic solvent from which the product is subseqently precipitated by the addition of water.

3. A process for the production of compounds having the formula

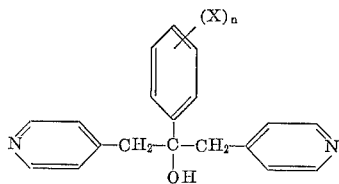

in which the symbol X represents a member selected from the group consisting of hydrogen, a halogen atom, an alkyl group having from 1 to 6 carbon atoms, a lower alkoxy group and a lower alkylmercapto group; and in which the symbol *n* represents the integer 1, with the proviso that where X is alkoxy, the symbol *n* represents also the integer 3 which comprises reacting lithium amide with 4-picoline, said reaction being carried out in liquid ammonia at a temperature not higher than the reflux temperature of said liquid ammonia, and, subsequently, reacting the 4-picolyl lithium thus formed, while suspended in liquid ammonia, with an ester having the formula

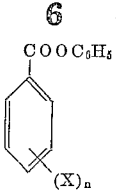

in which X is a member selected from the group consisting of hydrogen, a halogen atom, an alkyl group having from 1 to 6 carbon atoms, a lower alkoxy group and a lower alkylmercapto group; and in which *n* represents the integer 1, with the proviso, however, that where X is alkoxy, *n* represents also the integer 3, said reaction being carried out at a temperature not higher than the reflux temperature of liquid ammonia.

4. The process of claim 3 wherein, in next succeeding steps, the reaction mixture is treated with an ammonium salt of a mineral acid and evaporated to dryness, following which the residue is taken up in an inert organic solvent from which the product is subseqently precipitated by the addition of water.

5. A process of producing 2-phenyl-1,3-di(4-pyridyl)-2-propanol which comprises reacting 4-picolyl lithium with phenyl benzoate, said reaction being carried out in liquid ammonia as the reaction medium at a temperature not higher than the reflux temperature of liquid ammonia.

6. The process of claim 5 wherein, in next succeeding steps, the reaction mixture is treated with ammonium chloride and evaporated to dryness, following which the residue is taken up in boiling isopropanol, from which solution 2-phenyl-1,3-di(4-pyridyl)-2-propanol is subsequently precipitated by the addition of water.

7. The process of claim 6 wherein, in a next succeeding step, 2-phenyl-1,3-di(4-pyridyl)-2-propanol is reacted, while dissolved in ethyl acetate, with dry hydrogen chloride to form 2-phenyl-1,3-di(4-pyridyl)-2-propanol dihydrochloride.

No references cited.

WALTER A. MODANCE, *Primary Examiner.*

ROBERT T. BOND, *Assistant Examiner.*